United States Patent [19]

Malott

[11] 4,306,638

[45] Dec. 22, 1981

[54] SHOCK ABSORBER FOR AUTOMOTIVE SUSPENSION

[75] Inventor: Robert J. Malott, Flushing, Mich.

[73] Assignee: General Motors Corporation, Detroit, Mich.

[21] Appl. No.: 150,726

[22] Filed: May 19, 1980

Related U.S. Application Data

[63] Continuation of Ser. No. 924,580, Jul. 14, 1978, abandoned.

[51] Int. Cl.³ .............................................. F16F 9/36
[52] U.S. Cl. .............................. 188/322.16; 188/315; 280/709
[58] Field of Search ............. 188/315, 322; 267/64 R, 267/64 B, 65 B; 280/708, 709

[56] References Cited

U.S. PATENT DOCUMENTS

| 847,941 | 3/1907 | Hayward | 267/64 R |
|---|---|---|---|
| 1,727,121 | 9/1929 | Haines | 267/64 R |
| 2,057,893 | 10/1936 | Gross | 267/64 R |
| 2,078,364 | 4/1937 | Becker et al. | 188/315 |
| 2,244,150 | 6/1941 | Greve | 188/322 |
| 2,946,582 | 7/1960 | Martin | 267/64 R |
| 2,992,013 | 7/1961 | Zeigler et al. | |
| 3,096,084 | 7/1963 | Osterhoudt | 267/8 R |
| 3,160,406 | 12/1964 | Dickinson | 267/8 R |
| 3,300,202 | 1/1967 | Vinton | 267/64 B |
| 3,499,505 | 3/1970 | De Carbon | 188/322 X |
| 3,722,639 | 3/1973 | Keijer et al. | 188/315 |
| 4,105,193 | 8/1978 | Long, Jr. | 188/315 |

FOREIGN PATENT DOCUMENTS

| 844413 | 7/1952 | Fed. Rep. of Germany | 188/315 |
|---|---|---|---|
| 1073901 | 3/1954 | France | 188/322 |

*Primary Examiner*—George E. A. Halvosa
*Attorney, Agent, or Firm*—Charles R. White

[57] ABSTRACT

A suspension strut has a helical suspension spring which is supported by the reservoir tube of a hydraulic shock absorber. The shock absorber incorporates linear bearings between telescoping tubes thereof. The tube and bearing construction of the shock absorbers strenghtens the strut so that it effectively resists bending loads occurring during vehicle operation. This construction allows the piston rod of the shock absorber to be smaller in diameter and lighter in weight as compared to prior shock absorbers and to stroke without binding or sticking.

2 Claims, 3 Drawing Figures

SHOCK ABSORBER FOR AUTOMOTIVE SUSPENSION

This is a continuation of application Ser. No. 924,580, filed July 14, 1978, now abandoned.

This invention relates to automotive suspensions and more particularly to a non-binding shock absorber for vehicle suspensions with telescoping tubes and cooperating linear bearings to prevent bending of the piston rod of the shock absorber so that it is capable of stroking without binding.

Prior to the present invention, a number of vehicle suspensions incorporate a strut having a shock absorber operatively connected to a road wheel and a cooperating suspension spring supported by the shock absorber reservoir tube to provide the damped spring support of a vehicle body. With the shock absorber serving as a main suspension component, high torsional loads are often imposed on the shock absorber piston rod in the rebound mode of shock absorber operation. These loads are usually generated at the road wheel during braking and acceleration. Under severe conditions, the piston rod may be deflected or bent so that a stick-slip or binding of the shock absorber piston rod could occur. This detracted from the efficiency and service life of the strut and necessitated a larger diameter and stronger rod to resist bending. With increased piston rod size, weight is increased and a larger reservoir tube is required to accommodate the increased amount of oil displaced by the rod on shock absorber compression stroke.

In the MacPherson-type suspension strut in which this invention is preferably employed, there is a shock absorber unit that, according to this invention, comprises an inner cylinder tube which is disposed within an outer reservoir tube. Coaxially interposed between the inner and outer tubes is an auxiliary intermediate tube which is connected to one end of the piston rod which is mounted for reciprocal movement in the cylinder tube. The intermediate tube is supported for reciprocating movement with the piston rod by spaced linear bearings between the tubes so that any bending moments, such as applied through the vehicle wheel during acceleration or braking or during any suspension operation, is effectively resisted. With this invention and in contrast to prior shock absorbers, a smaller diameter piston rod can be effectively employed with long service life as a component in the shock absorbing unit of the strut. The shock absorber of this invention telescopes without binding and the increased strength of the strut provides for an effective and durable vehicle suspension.

These and other features, objects and advantages of the invention will be more apparent from the following detailed description and drawings in which.

Figure 1:
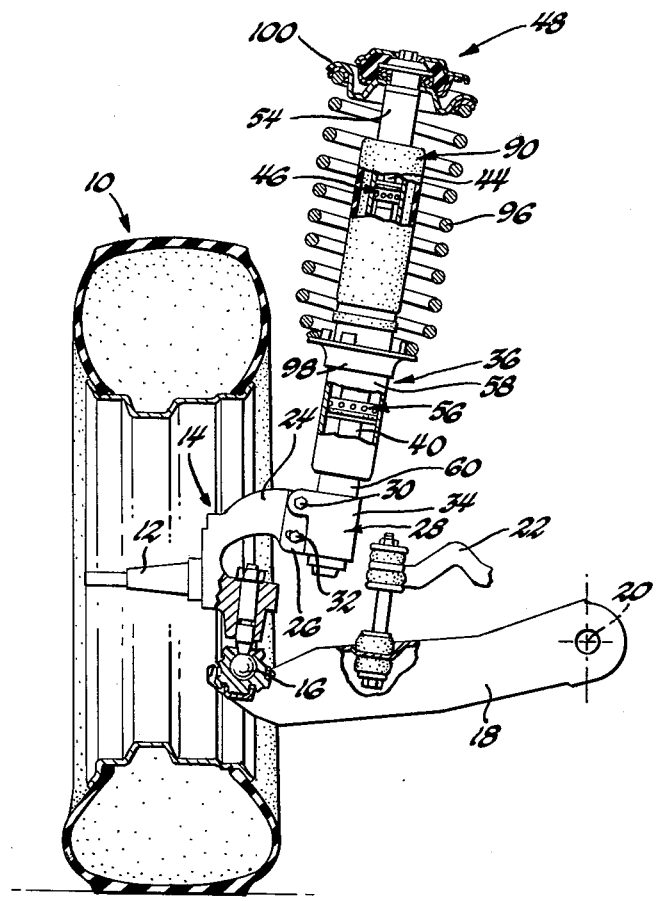
FIG. 1 is a front elevational view partly in section of a suspension strut and wheel assembly according to this invention.

Turning now in greater detail to the drawings, there is shown in FIG. 1 a vehicle road wheel 10 mounted on a conventional hub, not illustrated, that is rotatably supported on the spindle 12 of a steering knuckle 14. The steering knuckle is pivotally supported by ball joint 16 on the outer end of a laterally extending support arm 18 that projects outwardly from an inner pivot 20 that connects this arm to vehicle frame work, not shown. A conventional stabilizer bar 22 is operatively connected to the arm 18 for anti-roll purposes. The steering knuckle is formed with a leg member 24 having a terminal end connected to the flanges 26 of a strut bracket 28 by camber adjustment camming bolt 30 and a through bolt 32. The strut bracket 28 has a cylindrical socket 34 that receives the lower end of a suspension strut 36 which incorporates the preferred embodiment of this invention.

Figure 2:
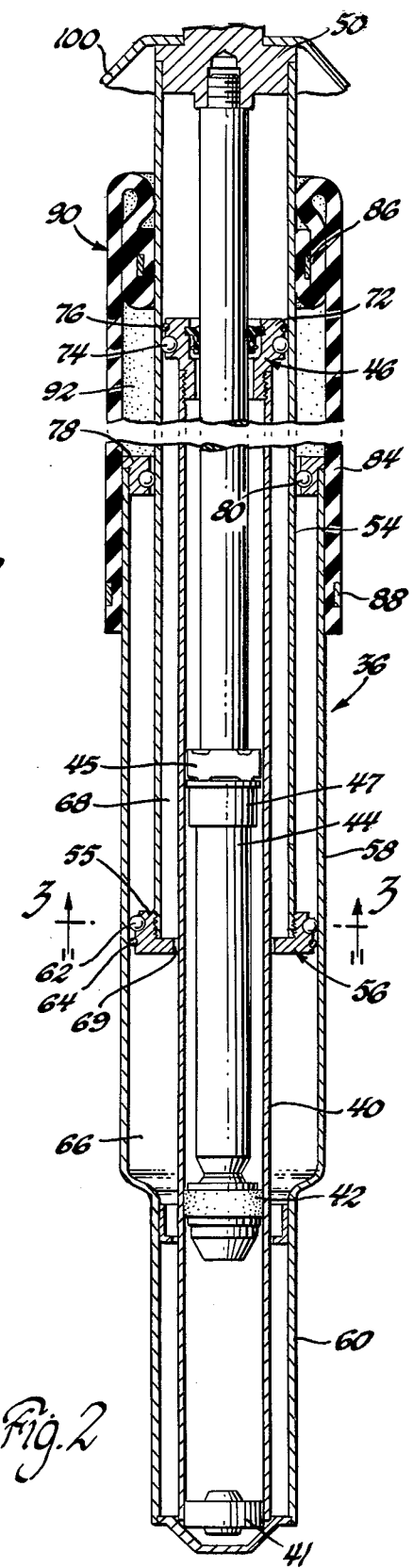
FIG. 2 is an enlarged sectional view of a portion of the suspension strut of FIG. 1.
Figure 3:
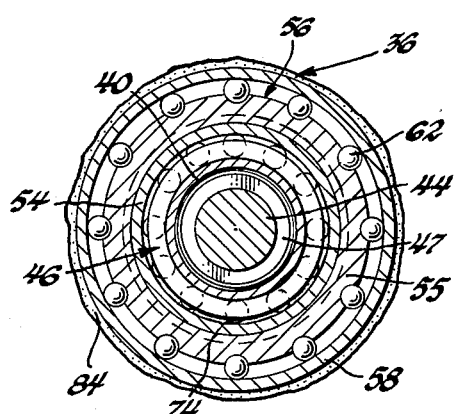
FIG. 3 is a sectional view taken along lines 3—3 of FIG. 2.

FIG. 2 shows details of the shock absorber unit of the suspension strut which includes an elongated inner cylinder tube 40 which is closed at its lower end by a base valve 41 and which contains a suitable damping fluid such as oil and in which piston 42 is mounted for reciprocal movement. The piston and base valve have conventional valving active on the compression and rebound stroke of the shock absorber of strut 36 for damping the ride motions of a vehicle as is well known in this art. The piston 42 is centrally secured to a cylindrical piston rod 44 that extends upwardly through the cylinder tube and through a rod guide and upper bearing assembly 46 that is fixed to and closes the upper end of the cylinder tube 40. The yieldable cushion 45 supported on collar 47 fixed to piston rod 44 is adapted to contact the bottom of the rod guide and upper bearing assembly to cushion rebound stroke of the shock absorber unit. A top mount assembly 48 fastened to a suitable bracket on the vehicle body, not shown, has a plug portion 50 to which the upper end of the piston rod 44 is threadedly connected. The plug portion 50 fits into and closes the end of an intermediate cylindrical tube 54 and, being connected to the piston rod, reciprocates therewith. The lower end of the intermediate tube 54 is connected to the interior of an annular peripheral wall 55 of a lower bearing assembly 56 that is slidably mounted in a cylindrical outer tube 58. The outer tube 58 provides a reservoir for the shock absorber oil as will be described below and has a reduced diameter lower portion 60 that is secured in socket 34 of bracket 28 by the tightening of bolts 30 and 32.

The lower bearing assembly 56 has a cylindrical outer wall in which a series of bearing balls 62, arranged in a circular pattern, are supported for sliding engagement with the inner surface of the outer tube 58. In addition to the balls 62, the peripheral wall of the bearing assembly supports an O-ring seal 64 which contacts the inner wall of the outer tube 58 so that the inner and outer tubes form a fluid chamber 66 providing a lower reservoir for shock absorber oil. The chamber 66 hydraulically communicates, via passage 69 in the bearing assembly 56, with an upper chamber 68 formed between the cylinder tube 40 and the intermediate tube 54 to provide additional reservoir space for shock absorber oil. This latter chamber is closed at its upper end by the rod guide and upper bearing assembly 46. As shown, the rod guide and upper bearing assembly 46 is formed with head portion 72 having an outer annular wall in which a series of bearing balls 74, arranged in a circular pattern, are mounted. The bearing balls 74 ride on the internal wall of the intermediate tube 54 to provide an upper bearing support for the shock absorbing unit of strut 36. In addition to supporting the balls 74, the head portion 72 of the rod guide and upper bearing assembly has an annular O-ring seal 76 which engages the inner wall of the intermediate tube 54 to hydraulically seal the upper chamber 68.

In addition to the sliding support of the intermediate tube provided by the rod guide and upper bearing assembly 46 and the lower bearing assembly 56, the shock absorber unit preferably has an intermediate bearing assembly 78. This intermediate bearing assembly comprises a shouldered cylindrical body which is secured on the upper end of the outer tube 58 and in which a series of balls 80, arranged in an annular pattern, projects radially inwardly into sliding engagement with the outer wall of the intermediate tube 54. With these bearing supports, the intermediate tube 54 can function as a major load supporting member of the strut 36 to resist torsionals imposed during operation as will be further described below.

A cylindrical boot 84 of rubber or rubber-like material is connected at its upper end by a band 86 to the intermediate tube and at its lower end to the outer tube by a band 88 to provide a rolling lobe air spring 90. The air chamber 92 formed by the intermediate and outer tubes 54 and 58 in cooperation with boot 84 is charged by a suitable pressure source through a conventional fitting in the wall of the outer tube 58. By accordingly increasing or decreasing the pressure in the air spring, the heighth of the unit can be accordingly adjusted to compensate for vehicle loading and to supplement the suspension force exerted by a helical suspension spring 96. As shown, suspension spring 96 is disposed around the air spring 90 and has its lower end seated on a spring seat 98 which, in turn, is secured to the outer tube of the shock absorber. From the lower seat, the spring extends upwardly to an upper spring seat 100 secured to the top mount of the strut and thus is supportive of the vehicle body.

The intermediate tube 54 in cooperation with the bearing assemblies and the inner and outer tubes 40 and 58 provide additional strength to the suspension strut to effectively prevent any binding of the piston rod 44 or other telescoping components of the shock absorber of the strut. For example, high torque loads imposed at the road wheel during acceleration or braking which are transmitted to the strut will be effectively resisted by the intermediate tube and linear bearings. This prevents bending of the piston rod and undesirable stick-slip or binding of the piston rod as it reciprocates in the cylinder tube. Additionally, with this construction, smaller diameter piston rods can be used in place of the prior large diameter rods previously needed to effectively withstand the torsional loads of strut-type suspensions.

While a preferred embodiment of this invention has been shown and described for purposes of illustrating the invention, other embodiments embodying the concepts of this invention may be adapted by those skilled in the art such as falls within the scope of the appended claims.

I claim:

1. A suspension strut for a vehicle having relatively movable sprung and unsprung masses, one of said masses being provided by a road wheel, the other of said masses being provided by a vehicle body, said suspension strut having one end operatively connected to said wheel of said vehicle, suspension spring means supported by said strut operatively connected to said body for the spring suspension thereof, said strut incorporating a shock absorber having an elongated cylinder tube with upper and lower ends and having a hydraulic fluid therein, a valved piston mounted for sliding reciprocal movement in said cylinder tube, a piston rod operatively connected to said piston and extending from said piston through said upper end of said cylinder tube, a piston rod guide slidably receiving said piston rod mounted in the upper end of said cylinder tube, an elongated reservoir tube disposed around said cylinder tube for forming a fluid reservoir and having a lower end operatively connected to said wheel of said vehicle, an elongated support tube attached to the upper end of said piston rod and extending between said reservoir tube and said cylinder tube, a plurality of bearing assemblies longitudinally spaced from one another and interposed between said tubes so that said support tube is supported at its sides at spaced points thereof and is mounted for reciprocating movement with respect to said reservoir tube, said bearing assemblies comprising first ball bearing and seal means extending radially outwardly from the lower end of said support tube into sliding engagement with the inner wall of said reservoir tube to space said support tube from said reservoir tube so that a fluid chamber is formed therebetween and second ball bearing and seal means carried by said rod guide and extending radially outwardly therefrom into sliding engagement with the inner wall of said support tube, one of said bearing assemblies having fluid passage means formed directly therein hydraulically connecting the interior of said support tube to said fluid reservoir, said tubes and said bearing assemblies cooperating to increase the strength of said strut and the resistance to bending loads imposed on said piston rod in response to bending moments resulting from relative movement of said sprung and unsprung masses.

2. A suspension strut for a vehicle having relatively movable sprung and unsprung masses, one of said masses being provided by a road wheel, the other of said masses being provided by a vehicle body, said suspension strut incorporating a hydraulic shock absorber telescopically movable between extending and collapsed positions, connector means operatively connecting one end of said suspension strut to said wheel of said vehicle, suspension spring means having one end carried by said suspension strut and the other end connected to said vehicle body, said shock absorber comprising an elongated cylinder tube having upper and lower ends and having a hydraulic fluid therein, a valved piston mounted for sliding reciprocal movement in said cylinder tube, a piston rod operatively connected to said piston and extending from said piston through said upper end of said cylinder tube, a piston rod guide mounted in the upper end of said cylinder tube for slidably receiving said piston rod, an elongated reservoir tube disposed around said cylinder tube forming a reservoir for said hydraulic fluid, elongated intermediate support tube attached to the upper end of said piston rod and extending between said reservoir tube and said cylinder tube, upper, lower and intermediate anti-friction bearing means longitudinally spaced from one another and operatively interposed between said tubes so that said intermediate support tube is spaced radially from said reservoir tube to form a fluid chamber therebetween and is guided for reciprocating and bind-free movement in said reservoir tube, said upper anti-friction bearing means being ball bearing means carried by said rod guide and extending radially outwardly therefrom for slidable engagement with the inner wall of said support tube, said lower anti-friction bearing means being ball bearing means carried by the lower end of said support tube and extending radially outwardly therefrom into engagement with the inner wall of said reservoir tube, said intermediate anti-friction bearing means being carried adjacent the upper end of said reservoir tube and extending radially inwardly therefrom into sliding engagement with said cylinder tube, fluid passage means extending through said lower anti-friction bearing means hydraulically connecting the interior of said support tube to said reservoir so that additional reservoir space is provided for said fluid, said tubes and said anti-friction bearing means cooperating to increase the torsional strength of said strut and to thereby prevent bending of said piston rod of said shock absorber.

* * * * *